Nov. 12, 1963

N. G. WORLEY 3,110,288

HEAT EXCHANGER CONSTRUCTION

Filed June 18, 1959

INVENTOR.
Norman G. Worley
BY
ATTORNEY

Nov. 12, 1963  N. G. WORLEY  3,110,288
HEAT EXCHANGER CONSTRUCTION
Filed June 18, 1959  7 Sheets-Sheet 2

INVENTOR.
Norman G. Worley
BY
*[signature]*
ATTORNEY

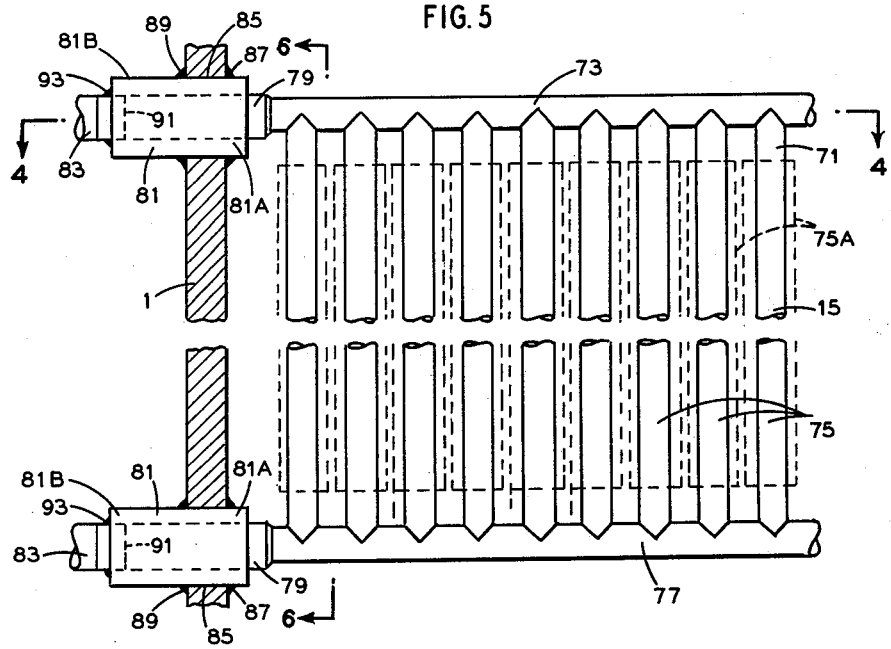
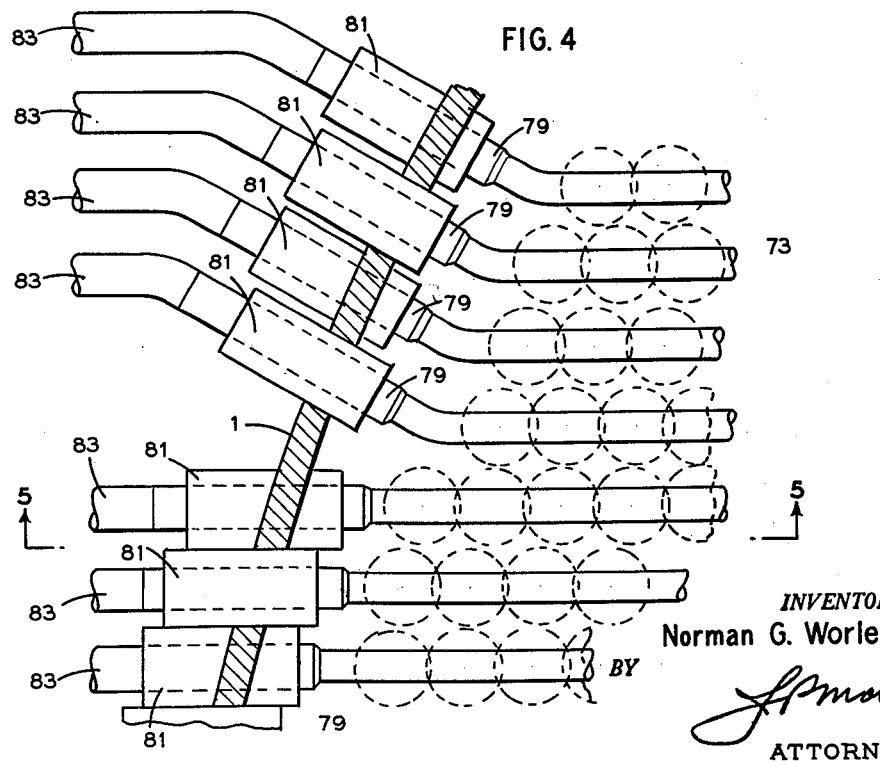

Nov. 12, 1963 N. G. WORLEY 3,110,288
HEAT EXCHANGER CONSTRUCTION
Filed June 18, 1959 7 Sheets-Sheet 4

INVENTOR.
Norman G. Worley
BY
ATTORNEY

INVENTOR.
Norman G. Worley
ATTORNEY

Nov. 12, 1963    N. G. WORLEY    3,110,288
HEAT EXCHANGER CONSTRUCTION
Filed June 18, 1959    7 Sheets-Sheet 6

INVENTOR.
Norman G. Worley
BY
ATTORNEY

Nov. 12, 1963  N. G. WORLEY  3,110,288
HEAT EXCHANGER CONSTRUCTION
Filed June 18, 1959  7 Sheets-Sheet 7

INVENTOR.
Norman G. Worley
BY
ATTORNEY

United States Patent Office 3,110,288
Patented Nov. 12, 1963

3,110,288
HEAT EXCHANGER CONSTRUCTION
Norman G. Worley, London, England, assignor to Babcock & Wilcox Limited, London, England, a British company
Filed June 18, 1959, Ser. No. 821,174
Claims priority, application Great Britain June 26, 1958
5 Claims. (Cl. 122—32)

This invention relates to heat exchangers, and more particularly to boilers for nuclear power plants and nuclear power plants incorporating such boilers. In known nuclear power plants of the kind having a reactor with a core utilizing a solid moderator and arranged to be gas cooled, the boilers have been in the form of vertical elongated cylindrical pressure vessels affording passages for coolant under pressure and containing economizer, vapour generating and superheating heat exchange surfaces comprising tube lengths extending transversely of the passages. In order to ensure adequate circulation through the sinuous tubes constituting the vapour generating sections, circulating pumps have been used.

In a nuclear power plant, reduction in power consumed by circulating fans and pumps or any provision whereby the output of the plant may be increased or its capital cost reduced is highly desirable and of great importance.

The invention includes a boiler for a nuclear power plant, adapted to be heated by coolant under substantial pressure, the heat exchange surfaces of the boiler being disposed within pressure vessel means, wherein a vapour generating section of the boiler of tubulous form is arranged to operate with longitudinal flow of the coolant in relation to the tubes and at least one economizer or superheater section of the boiler of tubulous form is arranged to operate with cross flow of the coolant in relation to the tubes.

The invention also includes a tubulous heat exchanger having a pressure vessel adapted for the flow therethrough of fluid under super-atmospheric pressure and containing a tube bank tubes of which are in staggered formation and are connected between distributor and collector headers longitudinally spaced in relation to the pressure vessel and extending across a fluid flow path within the pressure vessel, tubes of the bank being arranged for longitudinal flow of the said fluid in relation thereto and being formed with longitudinally extending fins or longitudinally extending rows of studs equiangularly distributed around the respective tubes and arranged so that the fins or rows of studs of adjacent tubes are interleaved.

The invention furthermore includes a tubulous heat exchanger having a pressure vessel adapted for the flow therethrough of fluid under superatmospheric pressure and containing a tube bank arranged for longitudinal flow of the said fluid in relation thereto, tubes of the bank being formed with respective longitudinally extending fins or rows of studs so arranged that the fins or rows of studs of adjacent tubes are interleaved.

The invention will now be described, by way of example, with reference to the accompanying partly diagrammatic drawings, in which:

FIGURE 4 is a sectional plan view of part only of a high pressure steam generating section of the heat exchanger, and is taken on the line IV—IV of FIGURE 5;

FIGURE 5 is a sectional side elevation taken on the line V—V of FIGURE 4, as viewed in the direction indicated by the arrows, details beyond the section line being omitted;

Figure 1:
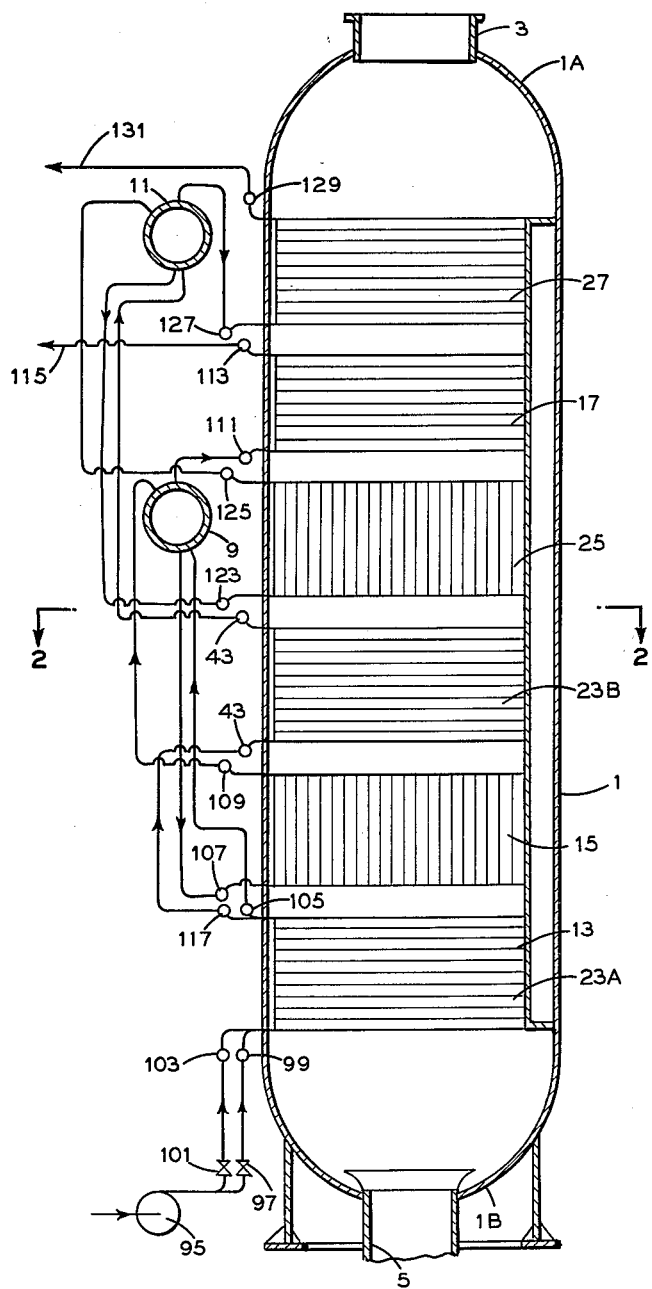
FIGURE 1 is a sectional side elevation through a tubulous heat exchanger associated with a gas cooled nuclear reactor.

Referring first to the embodiment of the invention illustrated in FIGURES 1 to 6, the tubulous heat exchanger includes a cylindrical pressure vessel 1 arranged with its axis vertical and provided at its top with a gas inlet 3 and at its bottom with a gas outlet 5. The heat exchanger is associated with a nuclear reactor of the gas cooled, graphite moderated type operating with an upward flow of coolant gas which passes through a duct to the inlet 3 of the heat exchanger, passes downwardly therethrough and is returned by a fan (not shown) from the outlet 5 to the lower part of the reactor. The gaseous coolant is, for example, carbon dioxide under a pressure of the order of 100 to 400 pounds per square inch, and it serves as a fluid heat carrier to transmit heat from the reactor core to the heat exchanger.

The pressure vessel 1 is formed of top and bottom sections 1A and 1B respectively and of intermediate annular sections. These sections are fabricated in a works by suitably shaping, pressing and welding steel plate, and the sections are united on site by circumferential welds.

Within the pressure vessel 1 are arranged tube banks forming the heat exchange surfaces of two boilers, a lower pressure boiler having a steam and water separating drum 9 and a higher pressure boiler having a steam and water separating drum 11. Associated with the drum 9 are a low pressure economizer 13, disposed adjacent the gas outlet 5, a steam generating section 15, and a low pressure superheater 17 disposed above section 15. Associated with the drum 11 are a high pressure economizer in two sections, one section 23A being interleaved with the economizer 13 and the other section 23B being disposed on the gas inlet side of section 15, a high pressure steam generating section 25, and a high pressure superheater 27 disposed between superheater 17 and the gas inlet 3.

Each of the tube banks forming an economizer or a superheater comprises a large number of parallel connected, sinuously bent tubes arranged with horizontally extending straight limbs appropriately joined at their ends by return bends and connected at their lower and upper ends through tubulous parts to headers positioned outside the pressure vessel. Thus the tube bank illustrated in FIGURE 3, the high pressure economizer section 23B, comprises a number of tube lengths 31 arranged to extend parallel to one another across the pressure vessel 1, tube lengths in the same vertical row being connected in series by return bends 33. Pairs of adjacent vertical rows of tube lengths are connected together at both their upper ends and their lower ends by tubular bifurcation pieces 35 provided on and forming part of tubulous connecting parts 37 which extend through thermal sleeves 39 provided in the wall of the pressure vessel 1. Outside the pressure vessel the parts 37 are connected by tube parts 41 to the headers 43.

The construction of the thermal sleeves 39 is similar to that described below with reference to the superheaters 17 and 27.

Each tube length 31 is provided with extended heat exchange surfaces (not shown) in the form of transverse fins. These fins are in the form of longitudinally extending rows of flat plates or in the form of annular plates welded to the tube lengths before the tube lengths in a vertical row are connected together by the return bends 33.

Since all welds between tubulous elements of the tube bank that lie within the pressure vessel are to be made before insertion of the parts concerned into the pressure vessel, it is necessary that the tubulous parts 37 should extend beyond the adjacent return bends sufficiently far for them to lie, when the tube lengths are in their final location, outside the pressure vessel. This precludes simple lowering of the assembled tube banks into their final position, and necessitates the provision of a certain amount of free space within the pressure vessel for manoeuvring of the tube banks into their final positions. The amount of room required for this manoeuvring is reduced by inclination of the axes of the outer thermal sleeves as indicated in FIGURE 2.

Figure 2:
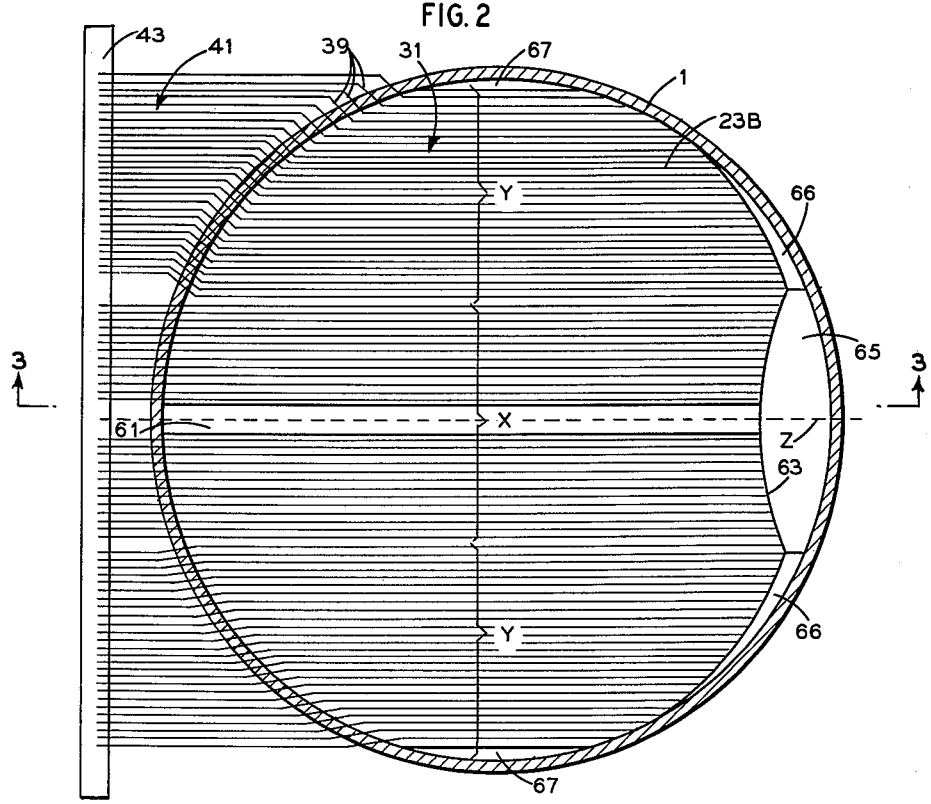
FIGURE 2 is a sectional plan view taken on the line II—II of FIGURE 1.

Thus over a central section of the tube bank occupying a central region X of the width of the pressure vessel the axes of the thermal sleeves 39 in each row are arranged with their axes parallel to the plane, indicated at Z in FIGURE 2, containing the longitudinal axis of the pressure vessel and passing centrally through that region, and over side sections of the bank occupying flanking regions Y the rows of thermal sleeves are arranged with their axes inclined from the inner to the outer ends of the sleeves away from the said plane.

During assembly of the complete heat exchanger, after erection of the pressure vessel 1 and before connection of the appropriate gas ducting to the gas inlet 3, the heat exchanger tubes of the banks described above are inserted as panels, one after the other, the shorter tube lengths which lie at the extreme outer limits of the regions being inserted first, and thereafter the assemblies, each of two adjacent vertical tube rows, are put in place in turn working towards the central part of the width of the pressure vessel. A small access space 61 is left between the two halves of the tube banks, and the tube lengths of the central region are of equal lengths so that when they are assembled in position their outer ends form an arcuate boundary 63 of an access space 65 left for the entry of an operative. This space is flanked by spaces 66 left by the assembly operation. The spaces 61, 65 and 66 and spaces 67 between the outermost rows of tubes and the pressure vessel wall are blanked off with suitable metal baffles after assembly of the tube lengths is completed, in order to prevent gases from passing through these spaces and so by-passing the heat exchanger tubes.

It will be seen that with a downward flow of gaseous coolant through the pressure vessel 1 the economizer and superheater tube banks will operate with a cross or transverse flow by coolant over the tube lengths. It has been found advantageous in the steam generating sections 15 and 25 to utilize a gas flow which is longitudinally of the tube lengths.

Figure 6:
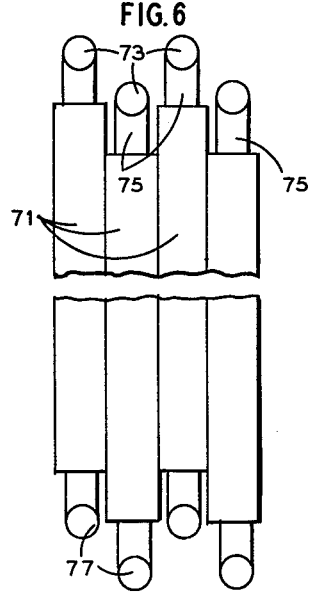
FIGURE 6 is a transverse sectional elevation taken on the line VI—VI of FIGURE 5, as viewed in the direction indicated by the arrows.

Referring now to FIGURES 4, 5 and 6, the low pressure steam generating section 15 is formed by a number of vertical panels 71 arranged side by side. Each panel comprises an upper sub-header 73 connected by a row of vertical straight tube lengths 75 to a lower sub-header 77. The arrangement is such that the sub-headers extend horizontally across the pressure vessel, side-by-side, to present in plan view an arrangement of tubular end parts of the bank which is similar to the arrangement of tubular end parts formed by the upper tube lengths in the tube bank shown in FIGURE 2.

The sub-headers 73 and 77 are respectively connected through tubulous connecting parts 79 to inlet and outlet headers positioned outside the pressure vessel. Parts 79 are severally associated with thermal sleeves 81, similar to the thermal sleeves 39, and outside the thermal sleeves are connected to tube parts 83 which are connected to inlet or outlet headers.

Each thermal sleeve 81 is in the form of a short thick-walled tube threaded through an aperture 85 in the pressure vessel wall and having one end part 81A extending a short distance inside the pressure vessel and a much longer opposite end part 81B extending outside the pressure vessel. Circumferential fillet welds 87 and 89 respectively inside and outside the pressure vessel secure the sleeve to the pressure vessel in a gas-tight manner. At the outer end of the sleeve the bore is enlarged somewhat to take a centering ring 91 which is threaded over the tubulous connecting part 79 after it is in position in the sleeve. Ring 91 serves to center the part 79 during the making of a circumferential fillet weld 93 between that part and the end of the thermal sleeve, and also provides backing for the weld metal then deposited.

In view of the closeness of the pitching of the sub-headers 73 and 77 across the width of the pressure vessel 1, it is not practical to arrange the thermal sleeves at the top of the bank, or those at the bottom of the bank, all in one row. They are therefore arranged in two rows at the top of the bank, one above the other with the sleeves in one row arranged opposite the spaces between the sleeves in the other row, and in a similar manner in two rows at the bottom of the bank. Since it is not practical to crank alternate sub-headers to match the vertical offsetting of their thermal sleeves, alternate panels 71 are off-set vertically as indicated in FIGURE 6.

The vertical tube lengths 75 are provided with extended heat exchange surfaces indicated by 75A, in the form of fifteen radial fins equally spaced about each tube length and extending lengthwise of the tube length. Conveniently each tube length is formed by cutting off a suitable length from an extruded tube having the fins formed integrally with it, the fins being machined off end parts of each tube length to provide plain tube ends which facilitate connection to the sub-headers and provide clearances between a sub-header and the fins on the tube lengths of adjacent panels. These clearances facilitate the attachment of supporting means for the tube panels.

Figure 3:
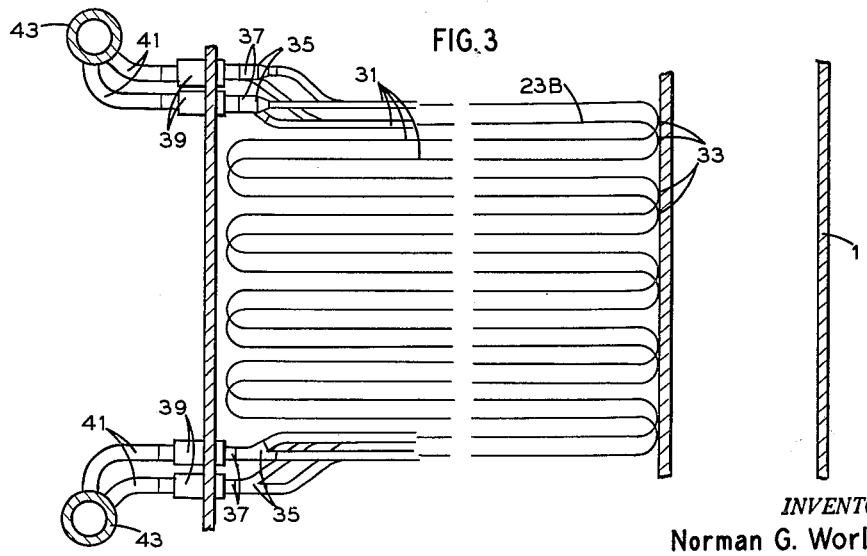
FIGURE 3 is a partial sectional side elevation taken on the line III—III of FIGURE 2 and shows a tubulous high pressure economizer.

As in the tube bank 23B shown in FIGURES 2 and 3, the axes of thermal sleeves in a central region adjacent the plane Z which includes the vertical axis of the pressure vessel are parallel to that plane while the axes of thermal sleeves in flanking regions of the bank are inclined from their inner to their outer ends away from that plane. Also the sub-headers in the flanking regions are shorter than those in the central region, the lengths becoming progressively shorter from the inner to the outer sides of the flanking regions. Furthermore, they are bent adjacent their ends nearer the headers to which they are connected to align with the axes of the associated parts 79 and thus the sleeves 81.

The manner of assembly of the panels forming the steam generating sections 15 and 25 is similar to the manner of assembly of the panels of the other tube banks, which has been described above.

When in position, the various tube banks are supported by metal slings secured to cross beams arranged in the spaces between the various tube banks.

The manner in which the inlet and outlet headers of the various tube banks are connected to one another and to the drums 9 and 11 is indicated diagrammatically in FIGURE 1. A feed water pump 95 is arranged to supply feed water under pressure through a first regulating valve 97 to an inlet header 99 of the low pressure economizer 13 and through a second regulating valve 101 to an outlet header 103 of the high pressure economizer section 23A. These regulating valves are automatically controlled to maintain desired water levels in the low pressure drum 9 and in the high pressure drum 11 respectively.

Outlet header 105 of the low pressure economizer 13 is connected to the water space of drum 9, this water space being connected to a lower, inlet header 107 of the low pressure steam generating section 15, the upper, outlet header 109 of which is connected to the steam space of drum 9. The steam space of drum 9 is connected to the inlet header 111 of the low pressure superheater 17, the outlet header 113 of which is connected to a steam main 115 leading to a low pressure turbine section, not shown.

Outlet header 117 of the high pressure economizer section 23A is connected to the lower, inlet header 43 of the economizer section 23B, the upper, outlet header 43 of which is connected to the water space of the high pressure drum 11. The water space of that drum is connected to a lower, inlet header 123 of the high pressure steam generating section 25, an upper, outlet header 125 of which is connected to the steam space of drum 11. The steam space of that drum is connected to inlet header 127 of the high pressure superheater 27, outlet header 129 of which is connected to a steam main 131 leading to a high pressure turbine section, not shown.

In use of the tubulous heat exchanger, heated carbon dioxide flows downwardly through the pressure vessel 1 over the heat exchange surfaces of the various tube banks disposed in the pressure vessel. The gas flow over the superheaters 17 and 27 and the economizer 13 and the economizer sections 23A and 23B is transversely of the tube lengths forming those banks, while the gas flow over the steam generating sections 15 and 25 is longitudinally of the tube lengths forming the heat exchange surfaces of those sections.

Feed water supplied under pressure by the pump 95 and under control of the regulating valve 97 flows through the low pressure economizer 13 into the drum 9, from which water flows under natural circulation upwardly through the vertical heat exchange tubes of the steam generating section 15, the steam-water mixture being discharged into the steam space of the drum. Steam-water separating means of conventional design and arrangement disposed in the drum separate the steam from the water, the steam flowing through the low pressure superheater 17 to the low pressure steam main 115 and thence to the low pressure turbine section.

Feed water supplied under pressure by the pump 95 and under control of the regulating valve 101 flows through the high pressure economizer section 23A and thence through the high pressure economizer section 23B into the drum 11. From that drum water flows under natural circulation upwardly through the vertical heat exchange tubes of the steam generating section 25, the steam-water mixture being discharged into the steam space of the drum. Steam-water separating means of conventional design and arrangement disposed in the drum separate the steam from the water, the steam flowing through the high pressure superheater 27 to the high pressure steam main 131 and thence to the high pressure turbine section.

In order to obtain a good internal coefficient of heat transfer in a superheater tube or in an economizer tube, a relatively high velocity of flow through the tube is necessary. On the other hand, in a steam generating tube, the internal boiling film co-efficient of heat transfer is independent of velocity of flow within the tube, and a relatively low velocity of flow through the tube is sufficient. With the arrangement of tubes in the various banks described above, the desired relatively high velocity of flow through the tubes in the superheater and economizer sections is obtained without the simultaneous use of a high velocity of flow through the tubes in the steam generating sections. It is possible for the steam generating sections to operate with a natural circulation of water, so enabling a reduction in the power consumed in pumps in the installation.

Furthermore, for a given pressure drop in the coolant gas between the gas inlet 3 and the gas outlet 5, it is possible to provide more total heating surface and thereby a larger output of steam by the use of longitudinal flow of coolant gas over the tubes in the two steam generating sections 15 and 25 than if all the tubes in the banks were arranged to operate with cross or transverse flow of coolant gas.

Figure 13:
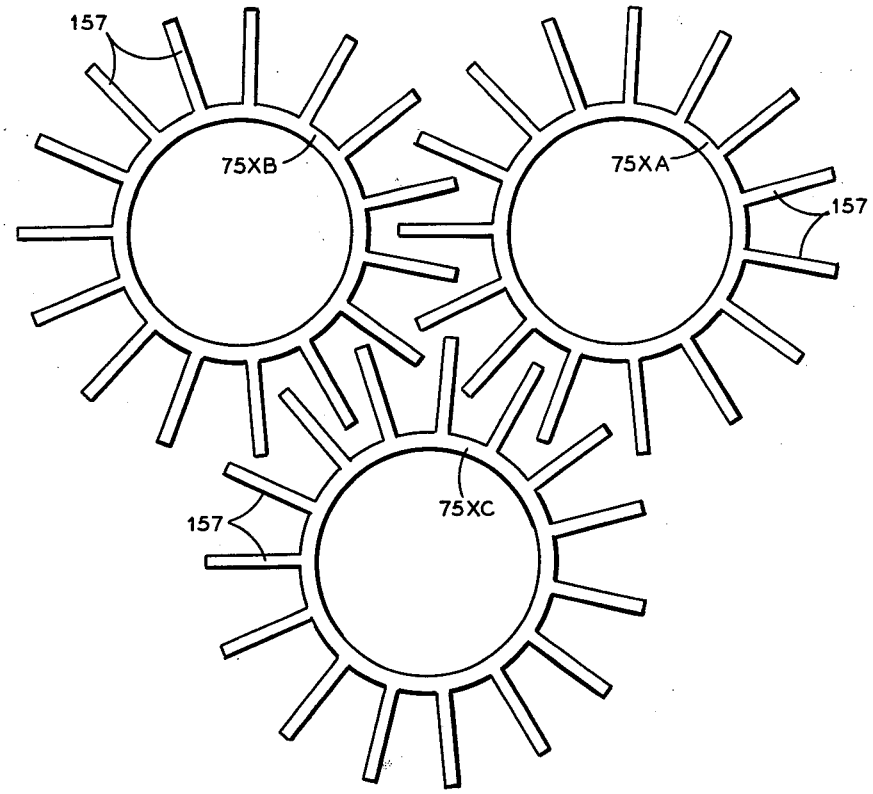
FIGURE 13 is a sectional plan view of a group of three vapour generating tubes shown in FIGURE 9, drawn to a much larger scale than in that figure.
Figure 7:
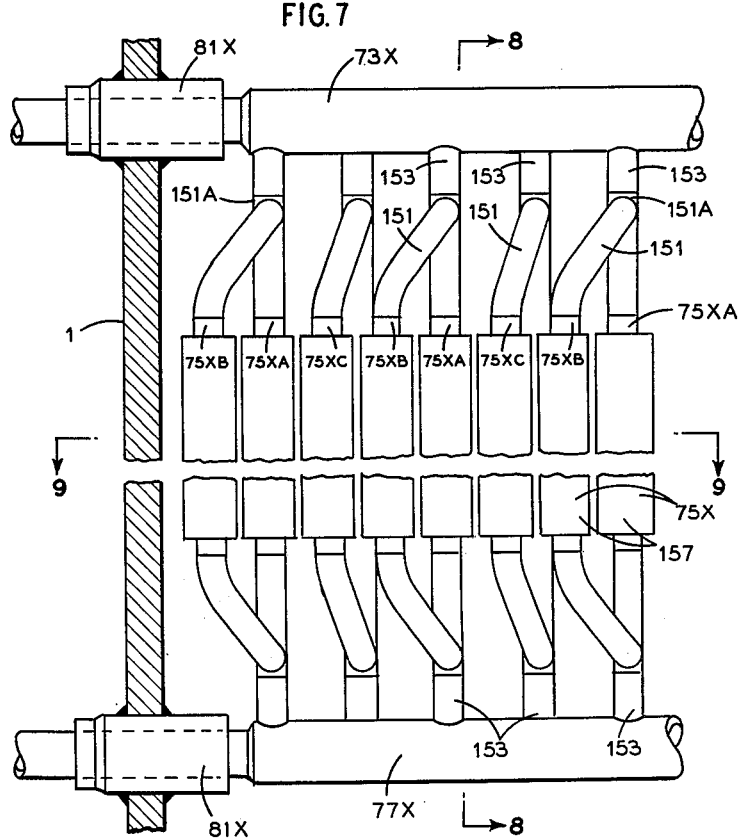
FIGURE 7 is a sectional side elevation of part of an alternative form of low pressure steam generating section, and corresponds to FIGURE 5.
Figure 9:
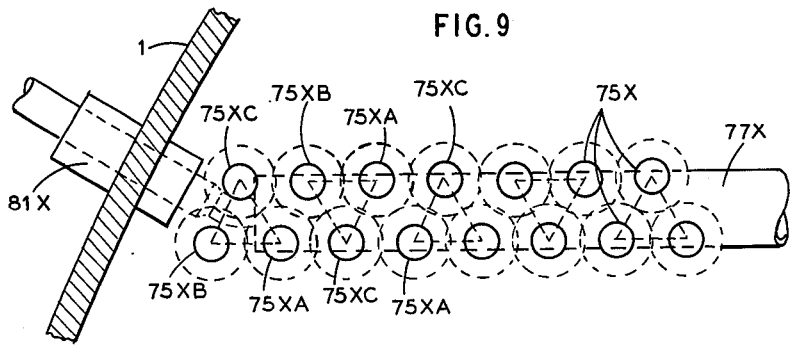
FIGURE 9 is a sectional plan view taken on the line IX—IX of FIGURE 7.
Figure 8:
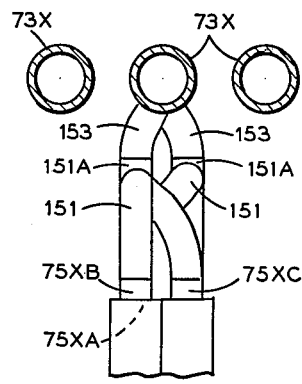
FIGURE 8 is a transverse sectional elevation taken on the line VIII—VIII of FIGURE 7, and as viewed in the direction indicated by the arrows.

In the embodiment of the invention described above with reference to FIGURES 1 to 6, each pair of sub-headers 73 and 77 serves a single row of vertical tube lengths 75. FIGURES 7, 8 and 9 illustrate an alternative construction for the steam generating sections 15 and 25 in which each pair of sub-headers serves two adjacent rows of vertical tube lengths 75X. The tube lengths are connected in groups each comprising a tube length 75XA, a tube length 75XB, and a tube length 75XC having their respective axes arranged at the apices of an equilateral triangle (see FIGURE 9), in each case tube lengths 75XA and 75XB lying in one of the two rows and the tube length 75XC lying in the other tube row. At their upper and at their lower ends the three tube lengths of a group are connected by welds respectively to the three legs of a trifurcation piece 151 having an arm 151A for the combined flow which is arranged co-axially with the tube length 75XA. Arm 151A is welded to a stub 153 itself welded to the adjacent upper sub-header 73X or adjacent lower sub-header 77X, the stubs 153 along each sub-header being displaced alternately towards opposite sides of the sub-header. Since each thermal sleeve 81X in this embodiment of the invention serves two rows of tube lengths 75X, it is not necessary for the thermal sleeves to be arranged in more than one row at either the top or the bottom of the tube bank. The tube lengths 75X are provided with extended heat exchange surfaces in the form of longitudinally extending radial fins 157 (see FIGURE 13) arranged to intermesh with one another in the manner of spur gear wheel teeth. They are formed integrally with the tube lengths, which are cut off from extruded tubes formed with the fins, the fins being machined off short terminal parts of the tube lengths to facilitate welding of the tube lengths to the trifurcation pieces 151.

Figure 11:
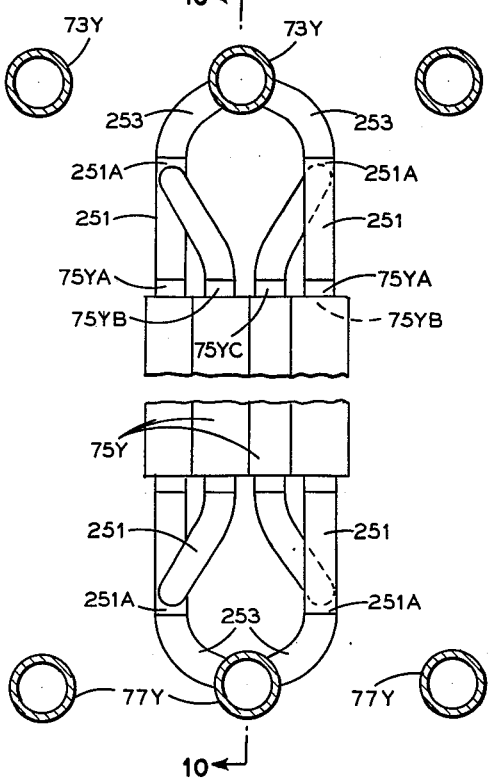
FIGURE 11 is a transverse sectional elevation taken on the line XI—XI of FIGURE 10, and as viewed in the direction indicated by the arrows.
Figure 12:
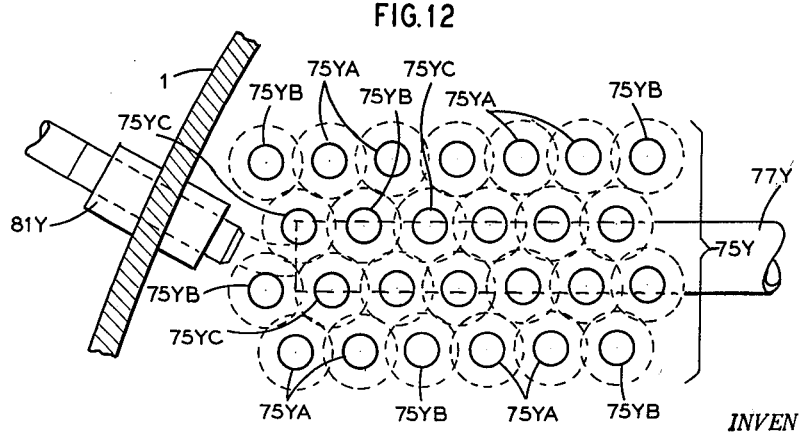
FIGURE 12 is a sectional plan view taken on the line XII—XII of FIGURE 10.
Figure 10:
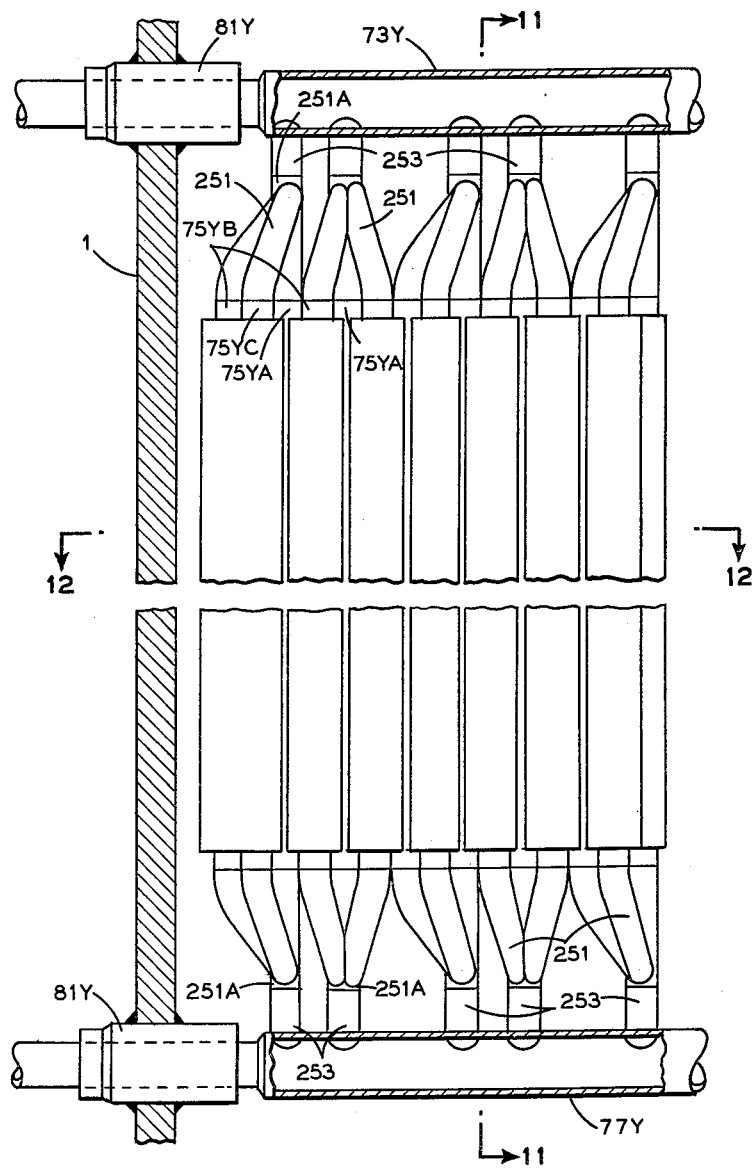
FIGURE 10 is a sectional side elevation of part of another alternative form of low pressure steam generating section, taken on the line X—X of FIGURE 11, and corresponds to FIGURE 5.

In the embodiment of the invention illustrated in FIGURES 10, 11 and 12, each pair of sub-headers serves four rows of vertical tube lengths 75Y. The tube lengths are connected in groups each comprising a tube length 75YA, a tube length 75YB, and a tube length 75YC having their respective axes arranged at the apices of an equilateral triangle (see FIGURE 12), in each case two of the tube lengths lying in one of a pair of the rows which lies to one side of a vertical plane containing the longitudinal axes of the sub-headers and the third tube length lying in the second row of the pair. At their upper and at their lower ends the three tube lengths of a group are connected by welds respectively to the three legs of a trifurcation piece 251 having an arm 251A for the combined flow which is arranged co-axially with the tube length 75YA. Arm 251A is welded to a stub 253 itself welded to the adjacent upper sub-header 73Y or adjacent lower sub-header 77Y, each of the stubs 253 being welded to the side of the sub-header at which lies the pair of tube rows which it serves. Since each thermal sleeve 81Y in this embodiment of the invention serves four rows of tube lengths 75Y, it is not necessary for the thermal sleeves to be arranged in more than one row at either the top or the bottom of the tube bank. The tube lengths 75Y are provided with extended heat exchange surfaces in the form of longitudinally extending radial fins arranged to intermesh with one another in the manner shown in FIGURE 13 and described above.

In the embodiments of the invention described above it will be seen that the thermal sleeves associated with the tubulous parts of each side section in the steam generating sections 15 and 25 parallel to one another and are substantially parallel to the inner surface of the pressure vessel adjacent the ends remote from the thermal sleeves of the outermost sub-headers of the side section. As a result of this arrangement, during assembly of the steam generating sections the sub-headers and the set of tube lengths connected thereto have, as a panel is placed in position, a lateral component of motion helping to render possible a relatively high ratio of heat exchange surface to pressure vessel internal cross-sectional area.

Although the use of heat exchange tube lengths formed with longitudinally extending integral fins is described and preferred, it is possible to provide the desired extended heat exchange surface in the form of longitudinally extending rows of studs welded to the tube lengths and so arranged that the rows of studs of adjacent tubes are interleaved.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. A heat exchanger having an elongated cylindrical pressure vessel arranged for passage of a first heat transfer fluid therethrough, a plurality of transversely spaced tubular heat transfer sections disposed therein parallel to a longitudinal diametral plane of said pressure vessel and arranged for passage of a second heat transfer fluid therethrough, inlet and outlet ends secured to each heat transfer section to form an integral panel, said ends of each panel extending from a first edge thereof adjacent and generally parallel to a portion of the circular wall of said pressure vessel, said ends extending through said pressure vessel wall and means forming a fluid-tight joint therebetween, at least some of said ends extending through said wall in substantially the plane of the related panels, means exterior of said vessel connecting with said inlet ends to supply said second heat transfer fluid thereto, said panels having said coplanar ends having a second edge opposite said first edge being spaced from a portion of the wall of said pressure vessel generally opposite said first named portion a distance at least as great as the extension of said inlet and outlet ends through said opposite pressure vessel wall, whereby said integral panels can be moved into location longitudinally of said pressure vessel.

2. A heat exchanger arrangement as claimed in claim 1 wherein a baffle means is disposed adjacent said second edge of said panels and in spaced relationship with the portion of said pressure vessel wall opposite said first named wall portion.

3. A heat exchanger arrangement as claimed in claim 2 wherein means is provided to close said baffle at each end thereof.

4. A heat exchanger arrangement as claimed in claim 1 wherein said panels having said coplanar ends comprise a central group disposed about said diametral plane, and outer groups of panels disposed between said center groups and said pressure vessel wall, said inlet and outlet ends of said outer groups of panels extending through said pressure vessel wall in a generally radial direction with respect to said pressure vessel.

5. A heat exchanger arrangement as claimed in claim 4 wherein a baffle means closed at both ends and extending the length of said pressure vessel is disposed adjacent said second edge of said center group of panels and in spaced relationship with the portion of said pressure vessel wall opposite said first named wall portion.

References Cited in the file of this patent

UNITED STATES PATENTS

| | | |
|---|---|---|
| 2,547,589 | Marshall | Apr. 3, 1951 |
| 2,552,505 | Patterson | May 8, 1951 |

FOREIGN PATENTS

| | | |
|---|---|---|
| 482,684 | Great Britain | Apr. 4, 1938 |
| 1,054,671 | France | Oct. 7, 1953 |
| 1,157,405 | France | Dec. 30, 1957 |
| 1,164,761 | France | May 19, 1958 |